United States Patent
Yim

(10) Patent No.: US 10,405,525 B2
(45) Date of Patent: Sep. 10, 2019

(54) FROZEN FOOD AQUARIUM FEEDER

(71) Applicant: Steven Yim, La Habra, CA (US)

(72) Inventor: Steven Yim, La Habra, CA (US)

(*) Notice: Subject to any disclaimer, the term of this patent is extended or adjusted under 35 U.S.C. 154(b) by 466 days.

(21) Appl. No.: 15/007,857

(22) Filed: Jan. 27, 2016

(65) Prior Publication Data
US 2016/0219842 A1 Aug. 4, 2016

Related U.S. Application Data

(60) Provisional application No. 62/111,086, filed on Feb. 2, 2015.

(51) Int. Cl.
  *A01K 63/00* (2017.01)
  *A01K 61/85* (2017.01)
  *A01K 61/80* (2017.01)

(52) U.S. Cl.
  CPC .......... *A01K 63/006* (2013.01); *A01K 61/80* (2017.01); *A01K 61/85* (2017.01); *Y02A 40/845* (2018.01)

(58) Field of Classification Search
  CPC ...... A01K 63/00; A01K 63/003; A01K 63/04; A01K 61/80; A01K 61/85; A01K 61/95; A01K 63/006
  See application file for complete search history.

(56) References Cited

U.S. PATENT DOCUMENTS

| 3,499,526 | A | | 3/1970 | Willinger | |
|---|---|---|---|---|---|
| 3,742,912 | A | | 7/1973 | Chen et al. | |
| 4,027,627 | A | * | 6/1977 | Fillion | A01K 39/014 119/51.11 |
| 4,829,705 | A | * | 5/1989 | Dorsey | A01K 91/18 43/44.99 |
| 4,903,429 | A | | 2/1990 | Tetenes | |
| 5,140,943 | A | | 8/1992 | Nearoff | |
| 5,778,824 | A | * | 7/1998 | Musgrave | A01K 61/85 119/230 |
| 6,009,835 | A | | 1/2000 | Boschert | |
| 6,070,554 | A | | 6/2000 | Wilson | |
| D535,718 | S | | 1/2007 | Jimenez et al. | |
| 7,249,435 | B1 | | 7/2007 | Tetenes | |
| 7,699,277 | B2 | | 4/2010 | Bagnall | |
| 7,850,134 | B2 | | 12/2010 | Tunza | |

(Continued)

*Primary Examiner* — Thanh Pham
(74) *Attorney, Agent, or Firm* — Kenneth L. Green; Averill & Green

(57) ABSTRACT

A frozen food aquarium feeder controls the melting and dispersion of frozen aquarium food. The feeder includes a rotatable first cylindrical column having a floor/ceiling including a set of passages and a rotatable second cylindrical column having a ceiling/floor including a matching set of passages. The cylindrical columns are assembled with an interference fit to a round bracket allowing each cylindrical column to be rotated with respect to the round bracket. The floor/ceiling of the first cylindrical column may reside against the ceiling/floor of the lower column, and the cylindrical columns may be positioned to provide a desired overlap between the passages to control the passage of melted food from the first cylindrical column to the second cylindrical column. The feeder may be positioned with the first cylindrical column extending above the aquarium water line, and ports in walls of the cylindrical columns may be positioned to intercept aquarium currents.

20 Claims, 4 Drawing Sheets

(56) References Cited

U.S. PATENT DOCUMENTS

| | | | |
|---|---|---|---|
| 2004/0237900 A1* | 12/2004 | Berry | A01K 61/85 |
| | | | 119/51.04 |
| 2005/0252456 A1* | 11/2005 | Allis | A01K 61/85 |
| | | | 119/51.04 |
| 2006/0124860 A1* | 6/2006 | Shim | A01K 63/04 |
| | | | 250/432 R |
| 2010/0012041 A1* | 1/2010 | Wechsler | A01K 39/012 |
| | | | 119/52.4 |
| 2010/0116217 A1 | 5/2010 | Allis | |
| 2011/0297093 A1* | 12/2011 | Lai | A01K 5/0114 |
| | | | 119/54 |
| 2014/0261211 A1 | 9/2014 | Tuan et al. | |
| 2014/0261215 A1* | 9/2014 | Tuan | A01K 61/025 |
| | | | 119/264 |

* cited by examiner

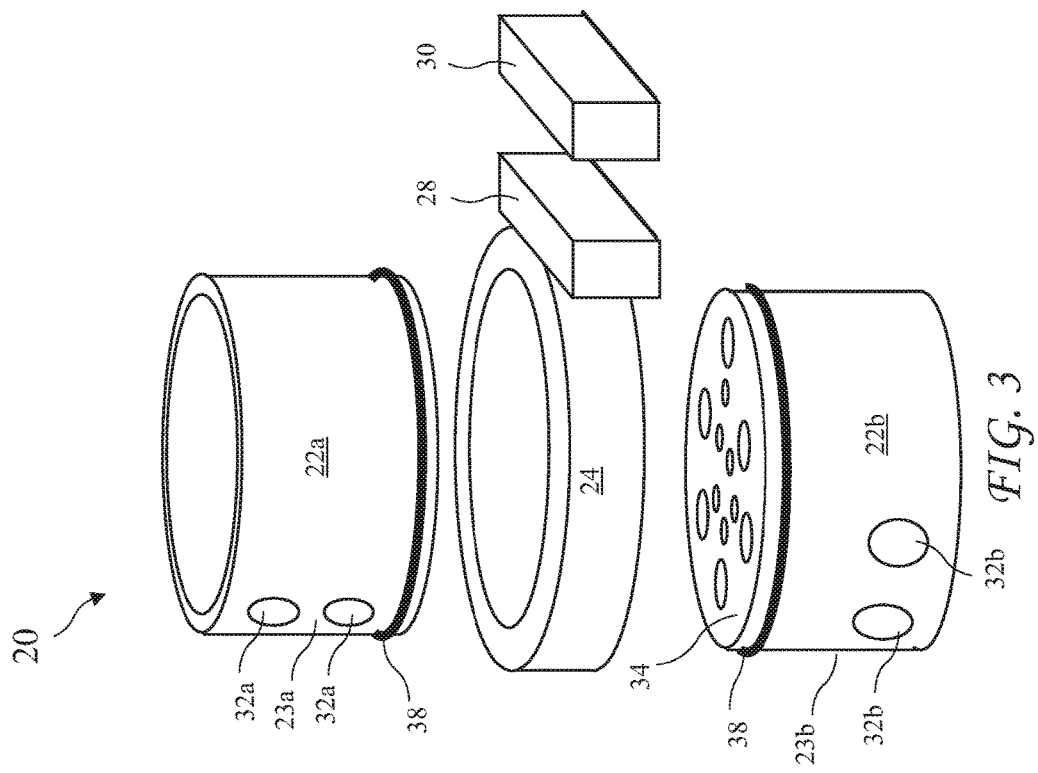
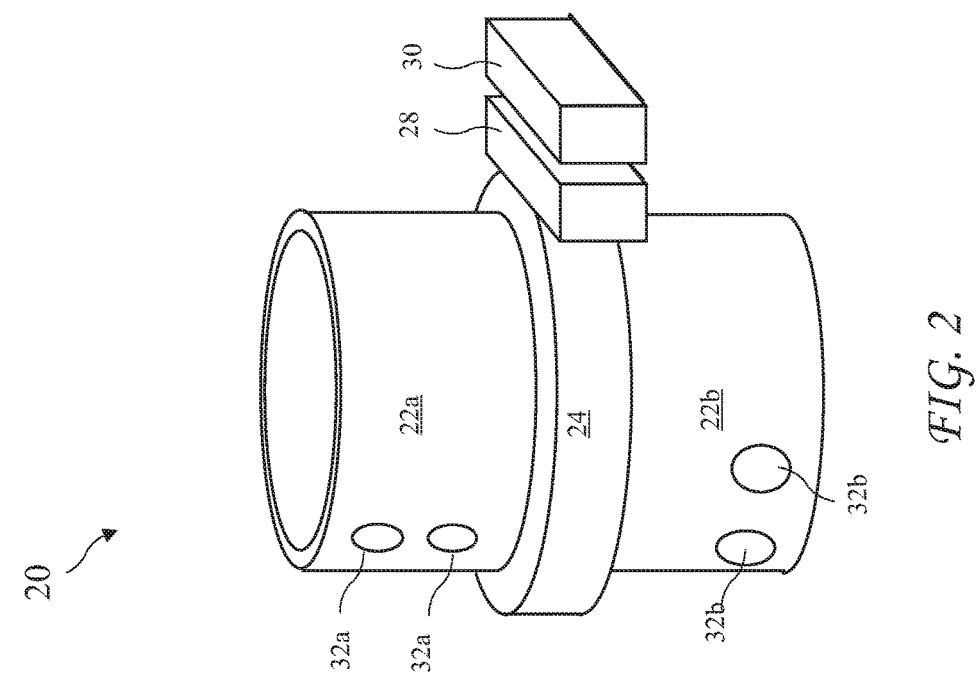

FROZEN FOOD AQUARIUM FEEDER

CROSS-REFERENCE TO RELATED APPLICATIONS

The present application claims the priority of U.S. Provisional Patent Application Ser. No. 62/111,086 filed Feb. 2, 2015, which application is incorporated in its entirety herein by reference.

BACKGROUND OF THE INVENTION

The present invention relates aquarium feeders and in particular to a frozen food aquarium feeder.

In aquarium environments, a preferred food type is protein foods that have been minced to different sizes containing brine shrimp, mysis shrimp, blood worms, krill, and squid. These foods are generally frozen and made into small cubes for easy feeding. These frozen foods thaw very quickly inside tropical aquariums (76-80 degrees Fahrenheit) and dispense the frozen food everywhere in the aquarium too quickly. Majority of the food is drawn into the surface filters and do not provide adequate time for the fish to eat. Frozen feeders exist in the form of a floating ring plate that contain the food and restricts the food from getting sucked into an aquarium filter, but does not alleviate the problem of the food melting too quickly.

BRIEF SUMMARY OF THE INVENTION

The present invention addresses the above and other needs by providing a frozen food aquarium feeder which controls the melting and dispersion of frozen aquarium food. The feeder includes a rotatable first cylindrical column having a floor/ceiling including a set of passages and a rotatable second cylindrical column having a ceiling/floor including a matching set of passages. The cylindrical columns are assembled with an interference fit to a round bracket allowing each cylindrical column to be rotated with respect to the round bracket. The floor/ceiling of the first cylindrical column may reside against the ceiling/floor of the lower column, and the cylindrical columns may be positioned to provide a desired overlap between the passages to control the passage of melted food from the first cylindrical column to the second cylindrical column. The feeder may be positioned with the first cylindrical column extending above the aquarium water line, and ports in walls of the cylindrical columns may be positioned to intercept aquarium currents.

In accordance with one aspect of the invention, there is provided a frozen feeder including a round bracket and two cylinder columns. The cylindrical columns are opposingly, rotatably attached extending upward and downward from the round bracket. The first cylindrical column includes an open top and a floor and the second cylindrical column includes an open bottom and ceiling, the floor and ceiling residing back to back. The cylindrical columns include overlapping hole patterns, and the overlap of the hole patterns may be adjusted by rotating one of the cylindrical columns with respect to the other cylindrical column to reduce the overlap for smaller sized frozen foods and to increase the overlap for larger sized frozen foods. The two columns are preferably held in place by an interference fit of rubber o-rings between the cylindrical columns and the round bracket.

In accordance with another aspect of the invention, there is provided a frozen feeder including ports in sides of each cylindrical column. The ports allow a fish keeper to adjust a water flow of aquarium water into the cylindrical columns to control the rate which the frozen food dispense into the aquarium water. Preferably, one cylinder includes vertically separated ports and the other cylinder includes horizontally separated ports. The fish keeper can arrange either cylinder as a top or bottom cylinder, and arrange the ports as needed.

In accordance with yet another aspect of the invention, there is provided a frozen feeder adaptable for feeding large pieces of whole frozen foods to carnivorous fish. Both cylindrical columns may be removed from the round bracket and the bracket position with the bracket top above the aquarium water surface and the floating frozen food is captured within the round bracket.

In accordance with still another aspect of the invention, there is provided a frozen feeder magnetically held in the aquarium. A magnet resides in a magnet cavity on one side of the round bracket, and an aquarium wall is sandwiched between the magnet and a cooperating external magnet to hold the frozen feeder in position.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 shows an assembled frozen fish food feeder according to the present invention.

FIG. 3 shows an exploded view of the frozen fish food feeder according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
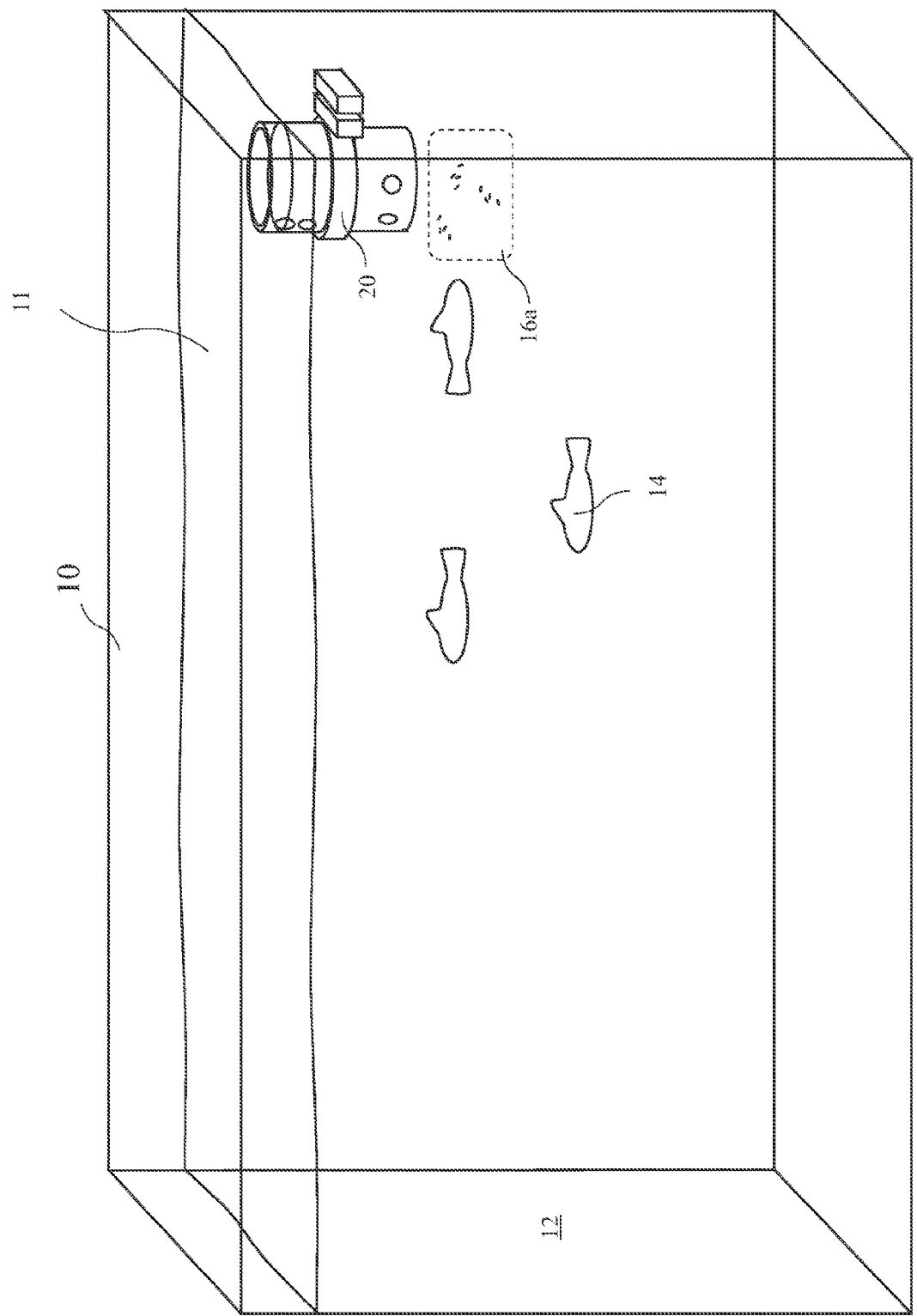
FIG. 1 shows an aquarium with three improved aquarium feeders according to the present invention.

An aquarium 10 with a frozen food aquarium feeder 20 according to the present invention is shown in FIG. 1. The frozen food feeder 20 resides partially reaching above the aquarium water surface 11, and is attached to an aquarium wall by magnets. The frozen food melts and is released as small food bits 16a into aquarium water 12.

The assembled frozen fish food feeder 20 is shown in FIG. 2 and an exploded view of the frozen fish food feeder 20 is shown in FIG. 3. The fish food feeder 20 includes a first cylindrical column 22a, a second cylindrical column 22b and a round bracket 24. The cylindrical columns 22a and 22b include O-rings 38 providing an interference fit to the round bracket 24 allowing the cylindrical columns 22a and 22b to be inserted and removed from the round bracket 24, and to be independently rotated which attached to the round bracket 24. The round bracket 24 includes a magnet 28 on one side, and the aquarium wall may be sandwiched between the magnet 28 and a second magnet 30 to position the frozen fish food feeder 20 in the aquarium.

The cylindrical columns 22a and 22b include vertically offset ports 32a in a first cylindrical wall 23a of the first cylindrical column 22a and horizontally offset 32b in a second cylindrical wall 23b of the second cylindrical column 22b respectively through a side of the cylindrical columns 22a and 22b allowing aquarium water to flow into the cylindrical columns 22a and 22b. The cylindrical columns 22a and 22b may be independently rotated to expose the ports 32a and 32b to more or less aquarium water current in the aquarium to adjust the rate which frozen fish food melts inside the frozen fish food feeder 20.

The cylindrical columns 22a and 22b are interchangeable and the directions of the ports 32a and 32b are adjustable as needed by a fish keeper to control the flow of water through the ports 32a and 32b. Such adjustment allows the fish keeper to control the dispersing of food in the cylindrical columns 22a and 22b.

Figure 4:
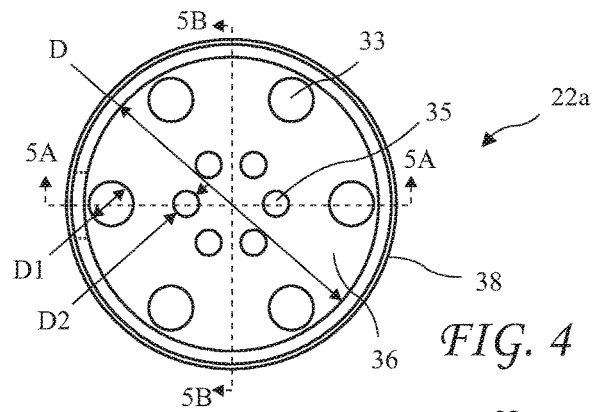
FIG. 4 shows a top view of a first cylindrical column of the frozen fish food feeder according to the present invention.
Figure 5A:
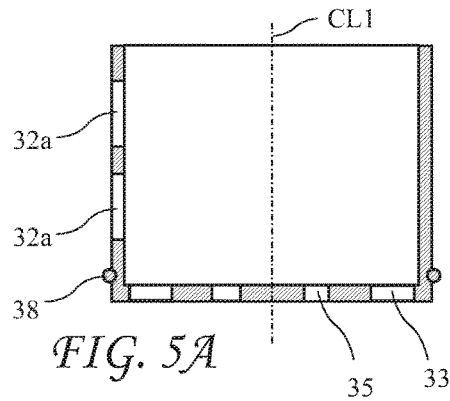
FIG. 5A shows a cross-sectional view of the first cylindrical column of the frozen fish food feeder according to the present invention taken along line 5-5 of FIG. 4.
Figure 5B:
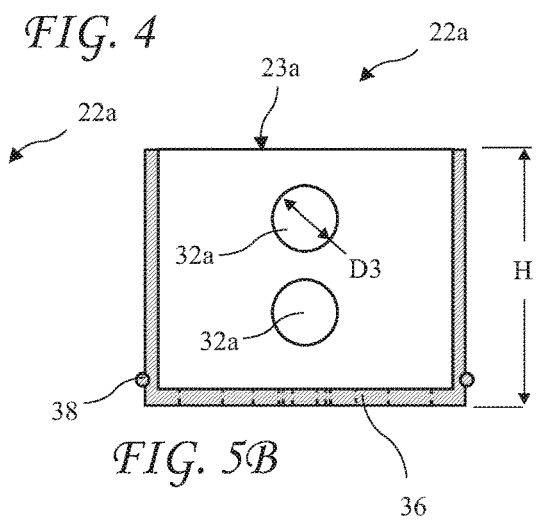
FIG. 5B shows a cross-sectional view of the first cylindrical column of the frozen fish food feeder according to the present invention taken along line 5-5 of FIG. 4.

A top view of the first cylindrical column 22a is shown in FIG. 4, a cross-sectional view the first cylindrical column 22a taken along line 5A-5A of FIG. 4 is shown in FIG. 5A, and a cross-sectional view of the first cylindrical column 22a along line 5B-5B of FIG. 4 is shown in FIG. 5B. The first cylindrical column 22a includes a floor 36 having large passages 33 and small passages 35, for example six large passages 33 near an outside edge and six small passages 35 near the center. The first cylindrical column 22a further includes a vertical centerline CL1. The cylinders have an inside diameter D of between 50 mm and 70 mm, and preferably 60 mm and a height H of between 40 mm and 60 mm and preferably about 50 mm. The large passages 33 preferably have diameters D1 between 7 mm and 9 mm and more preferably 8 mm. The small passages 35 preferably have diameters D2 between 5 mm and 7 mm and more preferably 6 mm. The ports 32a and 32b have a diameter D3 of preferably 10 mm. The first cylindrical column 22a has an open top 23a.

Figure 6:
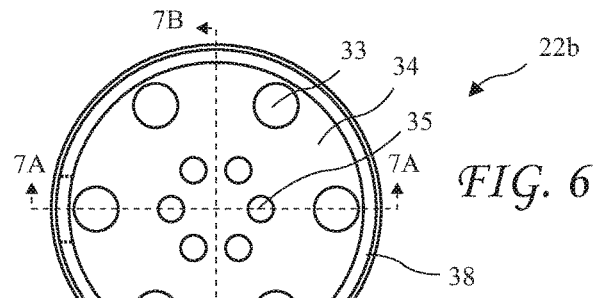
FIG. 6 shows a top view of a second cylindrical column of the frozen fish food feeder according to the present invention.
Figure 7A:
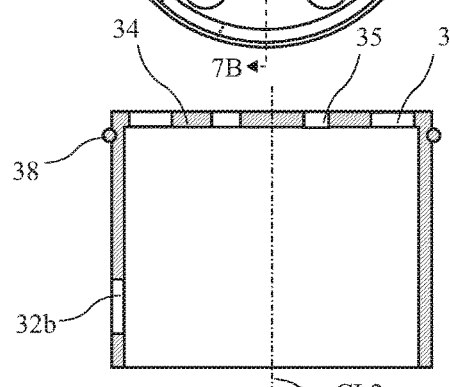
FIG. 7A shows a cross-sectional view of the second cylindrical column of the frozen fish food feeder according to the present invention taken along line 7A-7A of FIG. 6.
Figure 7B:
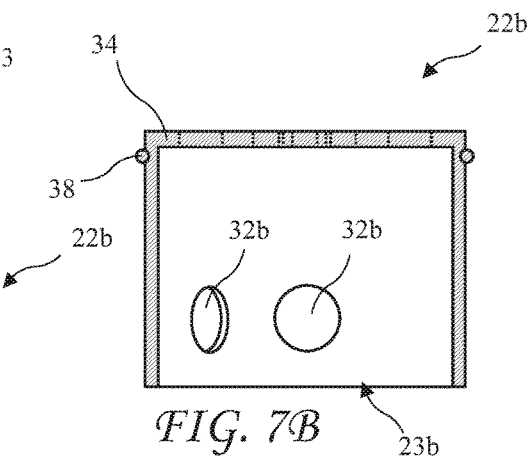
FIG. 7B shows a cross-sectional view of the second cylindrical column of the frozen fish food feeder according to the present invention taken along line 7B-7B of FIG. 6.

A top view of the second cylindrical column 22b is shown in FIG. 6, a cross-sectional view of the second cylindrical column 26 taken along line 7A-7A of FIG. 6 is shown in FIG. 7A, and a cross-sectional view of the second cylindrical column 22b taken along line 7B-7B of FIG. 6 is shown in FIG. 7B. The second cylindrical column 22b includes a ceiling 34 having large passages 33 and small passages 35, for example six large passages 33 and six small passages 35, and a vertical centerline CL2. The second cylindrical column 22b has an open top 23b.

Figure 8:
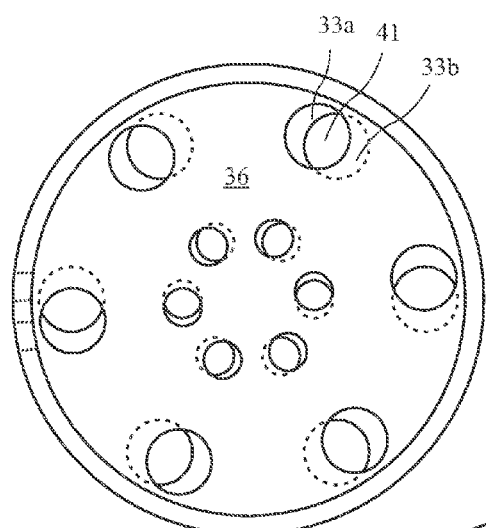
FIG. 8 shows cooperation of the first and second cylindrical columns of the frozen fish food feeder according to the present invention.

Cooperation of the first and second cylindrical columns 22a and 22b of the frozen fish food feeder are shown in FIG. 8. The first and second cylindrical columns 22a and 22b are independently rotatable to adjust an alignment of the passages 33 and 35 to provide an opening 41 between the first and second cylindrical columns 22a and 22b allowing melted food 16a to drop through the openings into the second cylindrical column 22a or 22b for release into the aquarium water 12 (see FIG. 1).

Figure 9A:
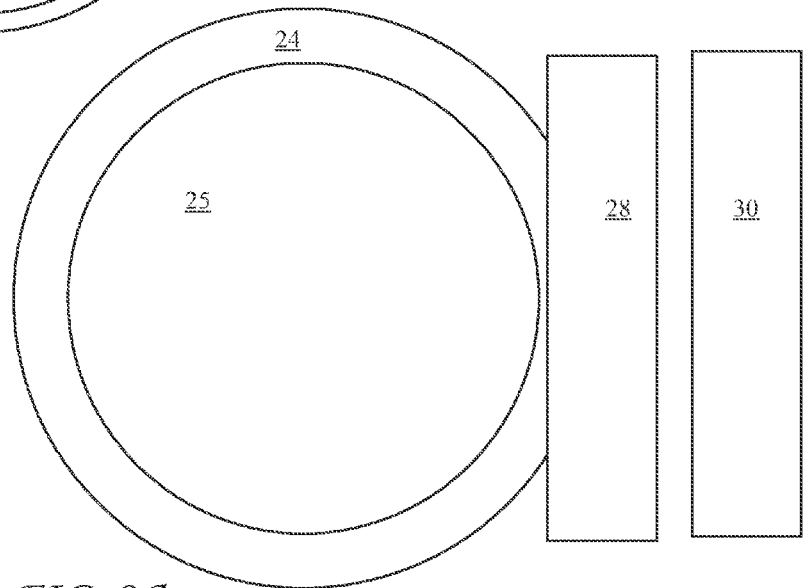
FIG. 9A shows a top view of a round bracket of the frozen fish food feeder according to the present invention.
Figure 9B:
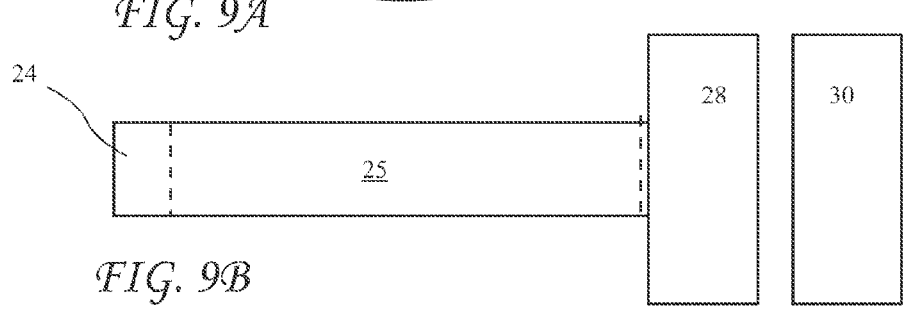
FIG. 9B shows a side view of the round bracket of the frozen fish food feeder according to the present invention.

A top view of the round bracket 24 is shown in FIG. 9A and a side view of the round bracket 24 is shown in FIG. 9B. The round bracket 24 includes a cylindrical passage 25 which receives the first and second cylindrical columns 22a and 22b in an interference fit.

The feeder is preferably made from acrylic material, but may be made of other similar material.

While the invention herein disclosed has been described by means of specific embodiments and applications thereof, numerous modifications and variations could be made thereto by those skilled in the art without departing from the scope of the invention set forth in the claims.

I claim:

1. A method for using a frozen fish food feeder, comprising:

obtaining a frozen food feeder comprising:
a first cylindrical column including:
a generally vertical first centerline radially centered and reaching axially through the first cylindrical column,
an open first top,
a floor at a first bottom of the first cylindrical column opposite to the first top, and
first passages through the floor,
a bracket having a generally vertical cylindrical opening therethrough;
a second cylindrical column including:
a generally vertical second centerline radially centered and reaching axially through the second cylindrical column;
lower ports in a second generally vertical cylindrical wall of the second cylindrical column,
a ceiling at a second top of the second cylindrical column,
second passages through the ceiling, and
an open second bottom opposite to the ceiling,
wherein:
the first cylindrical column resides attached to the bracket and rotatable about the first centerline;
the second cylindrical column resides attached to the bracket independently of the first cylindrical column and rotatable about the second centerline;
the floor of the first cylindrical column resides against the ceiling of the second cylindrical column; and
the first passages are variably alignable with the second passages providing openings between the first cylindrical column and the second cylindrical column;
positioning the frozen food feeder inside an aquarium with the first centerline and second centerline generally vertical and a top portion of the first cylindrical column above an aquarium water line and the rest of the frozen food feeder including the second cylindrical column below the aquarium water line with a first magnet attached to the frozen food feeder against an aquarium wall;

positioning a second magnet outside the aquarium and adjacent to the first magnet and magnetically attracted to the first magnet to hold the frozen food feeder in position;

placing frozen fish food into the first cylindrical column through the open first top;

the frozen fish food passing through the first passages and the second passages from the first cylindrical column into the second cylindrical column; and releasing the frozen fish food through the open second bottom of the second cylindrical column into the aquarium for feeding fish.

2. The method of claim 1, wherein:

the first cylindrical column includes first ports in a first generally vertical cylindrical wall of the first cylindrical column, and the method further includes aligning the first ports with aquarium water currents to obtain a first desired flow of aquarium water into the first cylindrical column.

3. The method of claim 2, wherein the method further includes aligning the lower ports in the second cylindrical wall of the second cylindrical column with the aquarium water currents to obtain a second desired flow of aquarium water into the second cylindrical column.

4. The method of claim 1, wherein the floor of the first cylindrical column is generally flat and the ceiling of the second cylindrical column is generally flat.

5. The method of claim 1, wherein the passages comprise large passages proximal to the walls and small passages, smaller than the large passages, between the large passages and centers of the floor and ceiling.

6. A method for using a frozen fish food feeder, comprising:

obtaining a frozen food feeder comprising:
  a first cylindrical column including:
    a permanently open top;
    a first generally vertical centerline CL1;
    a generally flat floor opposite to the top;
    first ports in a generally vertical first wall of the first cylindrical column; and
    first passages in the floor;
  a second cylindrical column including:
    a second generally vertical centerline CL2;
    a generally flat ceiling;
    a permanently open bottom opposite to the ceiling;
    second ports in a generally vertical second wall of the second cylindrical column; and
    second passages in the ceiling, and
  wherein:
    the first and second cylindrical columns are rotatably coupled about the first and second centerlines CL1 and CL2, the first cylindrical column above the second cylindrical column and the floor residing against the ceiling, and the first passages are variably alignable with the second passages to vary openings between the first cylindrical column and the second cylindrical column and the first and second ports are adjustable with respect to currents in an aquarium;

positioning the frozen food feeder inside an aquarium with the open top of the first cylindrical column facing up; and placing frozen fish food through the open top and into the first cylindrical column;

the frozen fish food passing through the first passages and the second passages from the first cylindrical column into the second cylindrical column; and releasing the frozen fish food through the open bottom of the second cylindrical column into the aquarium for feeding fish.

7. The method of claim 6, wherein the first ports comprise two vertically spaced apart ports and the first wall has no additional openings.

8. The method of claim 7, wherein the second ports comprise two horizontally spaced apart ports and the second wall has no additional openings.

9. The method of claim 8, wherein the first ports and the second ports are about 10 mm in diameter.

10. The method of claim 6, wherein the first ports comprise two horizontally spaced apart ports and the first wall has no additional openings.

11. The method of The feeder of claim 10, wherein the second ports comprise two vertically spaced apart ports and the first wall has no additional openings.

12. The method of The feeder of claim 11, wherein the first ports and the second ports are about 10 mm in diameter.

13. The method of The feeder of claim 6, further including a bracket attachable to an aquarium wall, the first cylindrical column and the second cylindrical column rotatably attached to the bracket and wherein the positioning the frozen food feeder inside an aquarium comprises attaching the bracket to the aquarium wall.

14. The method of The feeder of claim 13, wherein the bracket includes a generally vertical cylindrical passage therethrough, and the first cylindrical column and the second cylindrical column are attachable to the bracket by interference fits.

15. The method of The feeder of claim 14, wherein 0-Rings reside on outside surfaces of the first cylindrical column and the second cylindrical column and inside the generally vertical cylindrical passage of the bracket providing the interference fit.

16. The method of The feeder of claim 15, wherein the first cylindrical column and the second cylindrical column have an inside diameter between 50 mm and 70 mm and a height between 40 mm and 60 mm.

17. The method of The feeder of claim 6, wherein positioning the frozen food feeder inside an aquarium comprises positioning the frozen food feeder inside the aquarium with a top edge of the first cylinder column above an aquarium water line and a remaining portion of the frozen food feeder including the entire second cylindrical column residing below the aquarium water line.

18. A method for using a frozen fish food feeder, comprising:

obtaining a frozen food feeder comprising:
  a first cylindrical column having an inside diameter of about 60 mm and a height of about 50 mm and comprising:
    a permanently open top,
    a generally vertical first centerline CL1 radially centered and reaching axially through the first cylindrical column,
    a flat and generally horizontal floor at a first bottom of the first cylindrical column,
    first ports in a first wall of the first cylindrical column, the first ports about 10 mm in diameter,
    first outer passages in the floor having a diameter of about 8 mm; and first inner passages in the floor between the first outer passages and a first center of the floor and having a diameter of about 6 mm;

a second cylindrical column having an inside diameter of about 60 mm and a height of about 50 mm and comprising:
  a generally vertical second centerline CL2 radially centered and reaching axially through the second cylindrical column,
  a flat and generally horizontal ceiling at a top of the second cylindrical column,
  second ports in a second wall of the second cylindrical column, the second ports 10 mm in diameter,
  second outer passages in the ceiling having a diameter of about 8 mm,
  second inner passages in the ceiling between the second outer passages and a second center of the ceiling and having a diameter of about 6 mm;
  an open second bottom, and a bracket attachable to an aquarium wall, the first cylindrical column rotatably engages a cylindrical interior of the bracket proximal to the floor and the second cylindrical column rotatably engages the cylindrical interior the bracket proximal to the ceiling, the first and second cylinders independently rotatable about the first and second centerlines Cl1 and CL2 and the first outer and inner passages are variably alignable with the second outer and inner passages to vary openings between the first cylindrical column and the second cylindrical column and the first ports and second ports are adjustable with respect to currents in an aquarium, wherein either:
  the first ports are vertically spaced apart and the second ports are horizontally spaced apart, or
  the first ports are horizontally spaced apart and the second ports are vertically spaced apart;

positioning the frozen food feeder inside an aquarium with the open top of the first cylindrical column up; and placing frozen fish food through the open top and into the first cylindrical column;

the frozen fish food passing through the first passages and the second passages from the first cylindrical column into the second cylindrical column; and releasing the frozen fish food through the open second bottom of the second cylindrical column into the aquarium for feeding fish.

19. The method of claim 18, wherein the positioning the frozen food feeder inside an aquarium with the open top of the first cylindrical column up; comprises positioning the frozen food feeder inside the aquarium with a top edge of the first cylinder column above an aquarium water line and a remaining portion of the frozen food feeder and the entire second cylindrical column residing below the aquarium water line.

20. The method of claim 18, wherein the flat and generally horizontal floor is in contact with the flat and generally horizontal ceiling.

* * * * *